United States Patent [19]
Limanowka et al.

[11] Patent Number: 5,667,314
[45] Date of Patent: Sep. 16, 1997

[54] HORIZONTAL THRUST BEARING ASSEMBLY

[75] Inventors: Wojciech A. Limanowka, Edmonton; Robert C. Delong, Leduc, both of Canada

[73] Assignee: Baker Hughes Incorporated, Houston, Tex.

[21] Appl. No.: 571,318

[22] Filed: Dec. 12, 1995

[51] Int. Cl.$^6$ ...................................................... F16C 19/30
[52] U.S. Cl. .......................... 384/619; 384/613; 384/620
[58] Field of Search ....................... 384/590, 606, 384/609, 611, 613, 616, 618, 619, 620

[56]  References Cited

U.S. PATENT DOCUMENTS

| | | | |
|---|---|---|---|
| 2,936,201 | 5/1960 | Bader | 384/613 |
| 3,246,936 | 4/1966 | Carle | 384/308 |
| 4,033,647 | 7/1977 | Beavers | 384/248 |
| 4,198,104 | 4/1980 | Crase | 384/613 X |
| 4,240,683 | 12/1980 | Crase | 384/613 |
| 4,275,938 | 6/1981 | Roberts | 384/425 |
| 4,363,608 | 12/1982 | Mulders | 384/619 X |
| 4,501,454 | 2/1985 | Dennis et al. | 384/619 |
| 4,669,961 | 6/1987 | Lorett | 418/1 |
| 4,741,668 | 5/1988 | Bearden | 415/212 R |
| 4,838,758 | 6/1989 | Sheth | 415/140 |
| 5,221,214 | 6/1993 | Martin | 439/191 |

FOREIGN PATENT DOCUMENTS 210680   8/1960  Austria ................................. 381/613

*Primary Examiner*—Thomas R. Hannon
*Attorney, Agent, or Firm*—James E. Bradley

[57]  ABSTRACT

A thrust chamber for use in a horizontal hurst apparatus or other pump apparatus is disclosed. The thrust chamber includes a housing, a rotatable shaft mounted within the housing, a first downthrust bearing section connected to the shaft and to the housing, and a second downthrust bearing section also connected to the shaft and the housing. The two downthrust bearing sections are interconnected so that as a downthrust load is placed on the shaft, the first downthrust bearing section receives the load and engages the second downthrust bearing section so as to share the load substantially equally between the first downthrust bearing section and the second downthrust bearing section. Each downthrust bearing section is substantially alike and additional downthrust bearing sections may be added as desired. The thrust chamber further includes an upthrust bearing section, connected to the shaft and the housing. The upthrust bearing section provides pre-loading of the shaft so as to apply a load to the first downthrust bearing section and the second downthrust bearing section. A lubrication unit is also provided that utilizes apertures and channels within the various sections within the thrust chamber for allowing lubricant to reach the shaft and the bearings and then be returned in a closed system.

32 Claims, 3 Drawing Sheets

HORIZONTAL THRUST BEARING ASSEMBLY

BACKGROUND OF THE INVENTION

1. Field of the Invention

The present invention relates generally to an axial load pumping apparatus and, more particularly, to a thrust bearing used in a high axial load pumping apparatus.

2. Description of the Prior Art

High axial load horizontal pumps operate at rotational speeds of approximately 3600 revolutions per minute (rpm). While operating at such high rpm, the horizontal pump must also be able to bear a high load, typically ranging from 4,000 pounds to 8,000 pounds. To protect the motor driving the pump, the thrust bearing assembly is staged on the shaft to absorb the thrust. Unfortunately, at the high speed of operation typically found in such a horizontal pump, bearings used to carry the thrust load wear out quickly and thus have a short life span. Thrust bearing failure is a common problem because of the extreme conditions to which the bearings are subjected.

One solution to providing thrust bearings that can carry the load is to use a multiple bearing assembly with load sharing devices. The load sharing bearings that are normally used in such a situation must rely on precision machined bearing retainers and are limited in operational speed. Further, these particular bearings are very sensitive to tolerances and assembly errors as well as being very expensive.

Further, the thrust bearings must be lubricated during operation to protect them from the high temperature and stress to which they are subjected. Since an overall bearing assembly is compact in design, a path for lubrication is difficult to provide and lack of proper lubrication leads to shorter life expectancy due to high pressure and high temperatures.

Accordingly, what is needed is a thrust chamber bearing apparatus that is better able to transfer the load from the shaft to the thrust bearings and subsequently to the housing without requiring the precision machine bearing retainers typically used. Further, what is needed is a way of lubricating the thrust bearing assembly in such a way as to optimize lubrication and to reduce the operating temperature of the bearings.

SUMMARY OF THE INVENTION

According to the present invention, a thrust chamber for use in a horizontal thrust apparatus or other pump apparatus is disclosed. The thrust chamber includes a housing, a rotatable shaft mounted within the housing, a first downthrust bearing section connected to the shaft and to the housing, and a second downthrust bearing section also connected to the shaft and the housing. The two downthrust bearing sections are interconnected so that as a downthrust load is placed on the shaft, the first downthrust bearing section receives the load and engages the second downthrust bearing section so as to share the load substantially equally between the first downthrust bearing section and the second downthrust bearing section. Each downthrust bearing section is substantially alike and additional downthrust bearing sections may be added as desired. The thrust chamber further includes an upthrust bearing section, connected to the shaft and the housing. The upthrust bearing section provides pre-loading of the shaft so as to apply a load to the first downthrust bearing section and the second downthrust bearing section. A lubrication unit is also provided that utilizes apertures and channels within the various sections within the thrust chamber for allowing lubricant to reach the shaft and the bearings and then be returned in a closed system.

Each downthrust bearing section comprises a washer retainer that connects to the shaft and is rotatable therewith, a shaft bearing having a rotatable first phase and secondary phase, a down bearing thrust washer retainer, and a down thrust bearing spring. The shaft bearing has its rotatable first phase connected to the washer retainer and its second phase connected to the downthrust bearing washer in a stationary position relative to the housing. The downthrust bearing spring has one point connected to the downthrust bearing washer retainer and a second point coupled to the housing for transferring the downthrust load from the shaft to the housing. The housing for the downthrust section includes a first housing tube for containing the first downthrust section and the upthrust section and a second housing tube for containing the second downthrust section. The first housing tube is connected to the second housing tube through a tube connection ring. The tube connection ring is adjustable so as to apply a pre-load to the first thrust bearing section and to the second thrust bearing section and to any other thrust bearing section added thereto.

The downthrust bearing spring is an annular metal disc having a first inner diameter and a second outer diameter. The downthrust bearing engages the washer retainer substantially along the annular periphery of the inner diameter while the housing tube engages the bearing spring substantially along the annular periphery of the outer diameter, but on a side opposite the downthrust bearing washer retainer. The downthrust bearing spring typically has spring constant ranging from 300 to 450 pounds per mil with a preferred spring constant of about 400 pounds per mil. This allows each bearing spring to have an overload capacity of about 6,000 pounds.

DETAILED DESCRIPTION OF THE INVENTION

Figure 1:
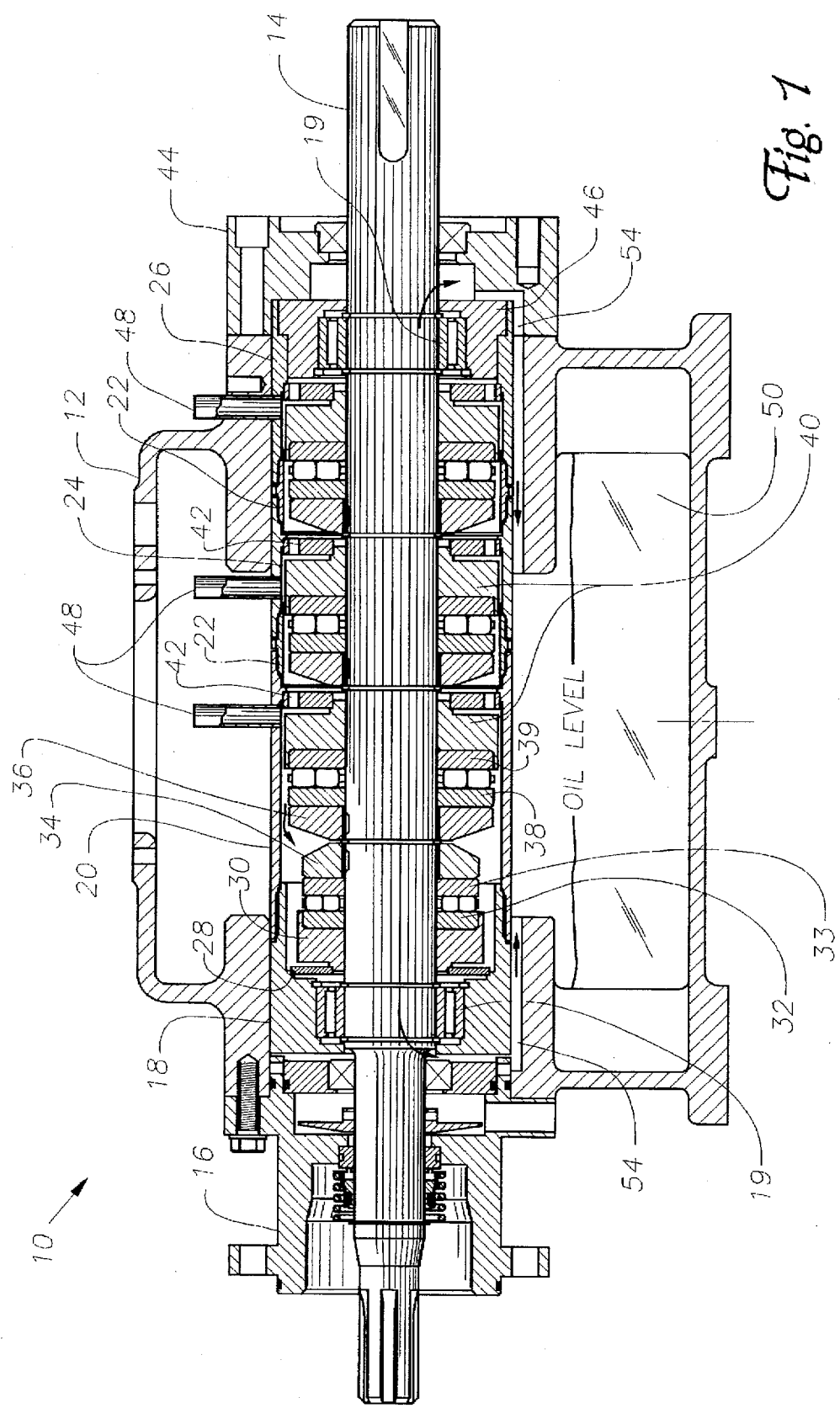
FIG. 1 illustrates a cross-sectional side view of a thrust bearing chamber apparatus according to the present invention.

FIG. 1 illustrates a cross-sectional side view of a thrust bearing chamber apparatus according to the present invention. The thrust chamber is ideally suited for horizontally mounted pumping stations in the well drilling or pumping industry. Thrust chamber 10 includes a thrust chamber housing 12, which houses a drive shaft 14. A head adapter unit 16 is used to couple shaft 14 to a pump inlet in a typical horizontal pumping system as is known in the art. Thrust bearing chamber 10 is further divided into four sections that include an upthrust section, a first downthrust section, a second downthrust section, and a third downthrust section.

The upthrust section includes an intake side radial bearing retainer 18 that includes radial bearings 19. Radial bearings 19 are mounted on shaft 14 and allow the shaft to rotate. Retainer 18 is further connected to a first housing tube 20. First housing tube 20 connects to tube connection ring 22, which further connects to a second housing tube 24. Another tube connection ring 22 is used to connect a third housing tube 26 to second housing tube 24.

Bearing retainer 18 seats an upthrust bearing spring 28 along one surface side on the outer perimeter of the bearing spring. Upthrust bearing spring 28 is an annular disc made from a rigid metal such as a steel or any other rigid material that has a spring constant K from 40–50 lbs/mil, with 42.8 lbs/mil being preferred. Bearing spring can be subjected to about 40 mils of deflection in operation, which is a spring force of 1700 lbs, with 17.5 mils of deflection being preferred, which is a spring force of 750 lbs. The bearing spring 28 has an inner diameter of approximately 2.500 inches (in), an outer diameter of approximately 4.200 in, and a thickness of approximately 0.155 in.

The other surface of bearing spring 28 seats on an upthrust bearing washer retainer 30 on the inside perimeter of the annular ring. This arrangement tensions bearing spring 28 both radially and horizontally. Retainer 30 abuts an upthrust bearing 32, which on one side is stationary, but on the other side 33 is rotatable, and they are separated by flat or tapered roller bearings. The rotatable side then connects to the shaft 14 and to an upthrust bearing washer retainer 34. Washer retainer 34 is keyed inserted into shaft 14 to rotate therewith. The flat bearings within bearing 32 rotate at one-half the speed of shaft 14.

The upthrust bearing 28 is used to preload the bearing set. This provides that the roller bearings are always operating in a loaded condition. This also preloads the springs which limits the deflection of the springs. This is important in that it is necessary to limit shaft travel to an acceptable value for both the pump and the mechanical seals that are located on the pump shaft. Typically, the shaft may shift horizontally by up to 1/50 of an inch. Further, the upthrust bearing also carries any upthrust loading from the pump at startup.

Next, a downthrust bearing washer retainer 36 is keyed to shaft 14 and is connected to downthrust bearing 38. Bearing 38 is constructed in similar manner to bearing 32, but is larger since it is designed to handle the downthrust force which is substantially greater than the upthrust force. One type of bearing contemplated is INA bearing type K894 10TN, available from INA.

A downthrust bearing washer retainer 40 secures horizontal spring bearing washer 39. One type of washer contemplated is GS874 10 and WS974, both from INA. Washer retainer 40 is further designed to receive downthrust bearing spring 42. Bearing spring 42 mounts to washer retainer 40 on one side along its interior periphery of its annular shape. Further, bearing spring 42 is then held in place along its outer peripheral on the opposite side by first housing tube 20. The next two sections are constructed the same as the first downthrust section just described. Specifically, washer retainer 36, shaft washer 38, horizontal spring bearing washer 39, downthrust bearing washer retainer 40 and downthrust bearing spring 42 interconnect shaft 14 with second housing tube 24 as previously described.

Spring constants can change as load demands. Downthrust bearing spring 42 is an annular disc made from a rigid metal such as a steel or any other rigid material that has a spring constant K from 300–450 lbs/mil, with 400 lbs/mil being preferred. Each spring has an inner diameter ranging from 2.498–2.502 inches (in), with 2.500 preferred. The outer diameter of each spring ranges from 4.598–4.602 in, with 4.600 preferred. The thickness of each spring ranges from 0.354–0.358 in, with 0.356 preferred. Bearing spring 42 can be subjected to a load of about 15 mils of deflection in operation, which is a spring force of 6000 lbs, with 10 mils of overload deflection being preferred, which is a spring force of 4000 lbs.

A third downthrust bearing stage is further provided and is assembled in much the same way as the first two stages. Namely, washer retainer 36, shaft washer 38, HSG washer 39, downthrust bearing washer retainer 40, and downthrust bearing spring 42 interconnect with shaft 14 with third housing tube 26.

A radial bearing retainer 46, which is placed on the motor side of thrust chamber 10, closes the thrust bearing spring assembly and protects it from contamination. A second radial bearing 19 allows shaft 14 to rotate.

In this design, the load is transferred from shaft 14 to the plurality of thrust bearing springs 42. Each thrust bearing spring is made of steel and is used to transfer the load from the bearing retainers to the housing assembly. As the load is applied to one bearing, the spring deflects allowing the shaft to load the second bearing, which in turn transfers the load through a spring to the housing. This system can use at least two bearings and springs and is not limited to the embodiment shown, which has three springs and bearings.

This arrangement achieves approximately equal load sharing on each of the bearings. This is accomplished by accurately measuring the deflection of the spring or measuring the axial stress of the housing tubes, or both. Given equal deflection of the springs, there is equal load sharing on each of the bearings. If the load is not shared equally, the bearing that carries the highest load produces large quantities of heat and hence will be a local hot spot. The individual bearing locations can be monitored to determine operating temperature. This allows one to predict failure as well as for setting the optimum operating points for the bearing set.

The apparatus thus described is designed to operate with a downthrust load of about 12,000 lbs, with a critical overload capacity of 18,000 lbs. The load is to be divided substantially equally amongst the three bearings, but a ratio of 3000, 4000, and 5000 lbs is possible in worst scenarios and the assumed maximum unequal load share is 4750, 6000, and 7250 lbs between bearings at operating speeds of approximately 3,600 rpm.

The spring suspension of the bearing assembly allows for errors up to 15 mil on one bearing or 7.5 mil on two bearings for a 50% overload where the shaft deflects up to 10 mil. Maximum allowed assembly error for a 25% overload is about 6.5 mil. Compared to conventional fixed bearing design, maximum allowed assembly error is up to 20 times higher. Bearings spring suspension design requires shorter assembly time and assembly and parts cost is lower and parts tolerance is not as critical as it is for fixed bearings load sharing design.

The load distribution between the three bearings suspended on springs 42 can be adjusted by tuning the thrust bearing assembly. Specifically, the bearings are installed inside their respective housing tube 20, 24, 26. The length is then adjusted by turning the connection rings 22. The connection rings 22 have left-handed threads on one side and right-handed threads on the other side. By turning the rings 22, the ring is screwed into or out from the tubes 20, 24, 26, thus allowing axial assembly overplay to be eliminated.

Chamber 10 also has a pressure fed lubrication system shown in FIG. 1. Lubricant is fed through housing tube openings 48 through each housing tube 20, 24, 26. Lubricant flows from lubricant openings 48 between the housing tubes and their respective downthrust bearing washer retainers 40 to lubricate the bearings and shaft and to lower the operating temperature of the shaft assembly. The lubricant returns via gravity flow through passages 54 at each end of housing 12 to the oil pan 50. The pressure fed lubrication system is used to remove excess heat and the lubricating oil is filtered to maintain the oil free from any metal particles or any water contamination. The oil is also cooled as required for the particular application. The pump operates from about 10 to 40 pounds per square inch (psi) and delivers about ¼ gallon of lubricant per minute per bearing.

Figure 2:
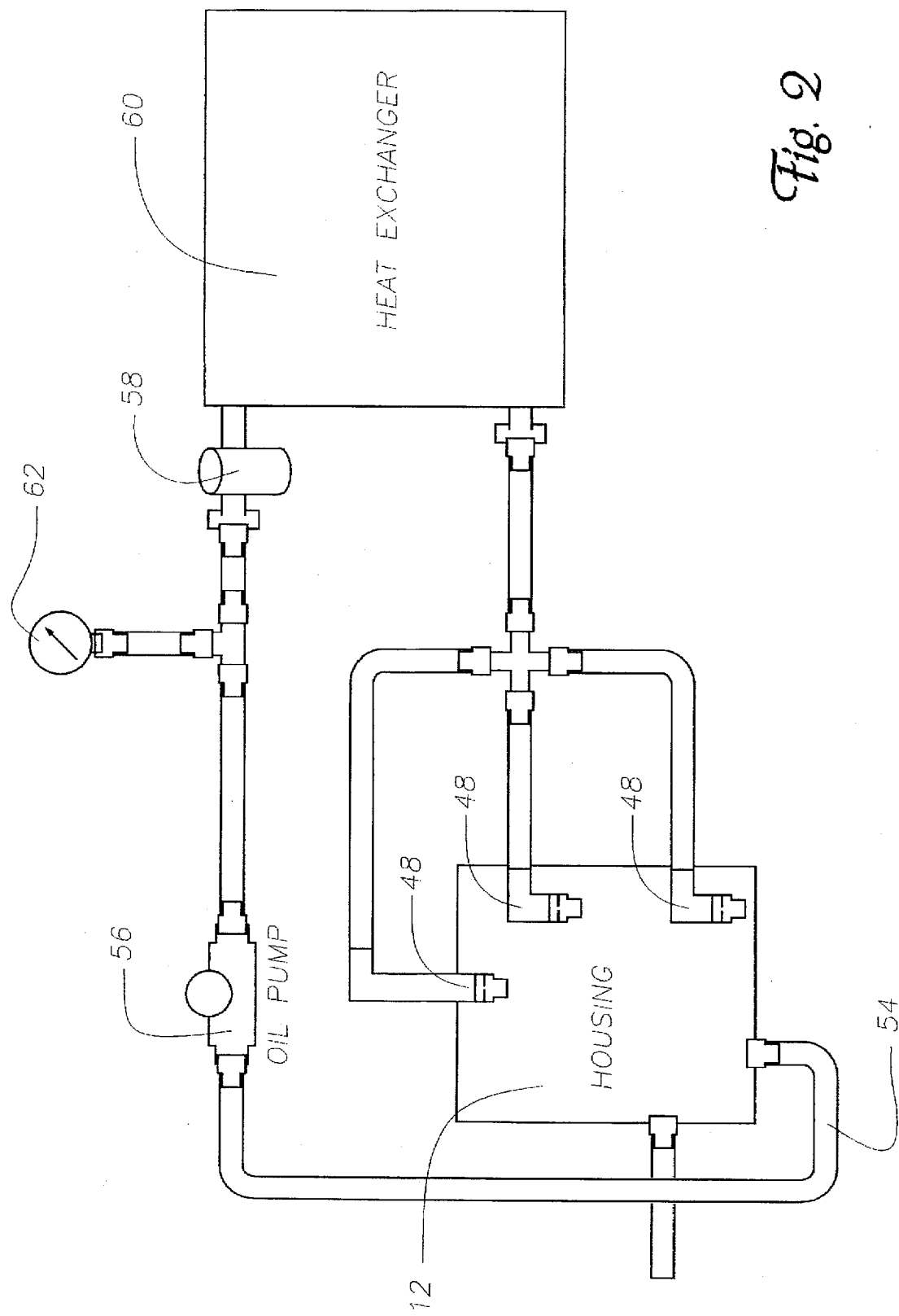
FIG. 2 depicts a schematic diagram of the lubricating system according to FIG. 1.

FIG. 2 depicts a schematic diagram of the lubricating system according to FIG. 1. The system is a closed-loop system with lubricant being fed into the housing 12 through housing housing opening 48. The oil lubricant passes within the housing and exits out return pipe 54. From there, oil pump 56 pumps the oil through filter 58 and then to heat exchanger 60 before returning the lubricant to housing 10. A pressure gauge 62 is used to measure the pressure of the system or is used to provide safety shutdown relief if there is inadequate lubrication, or both.

Figure 3:
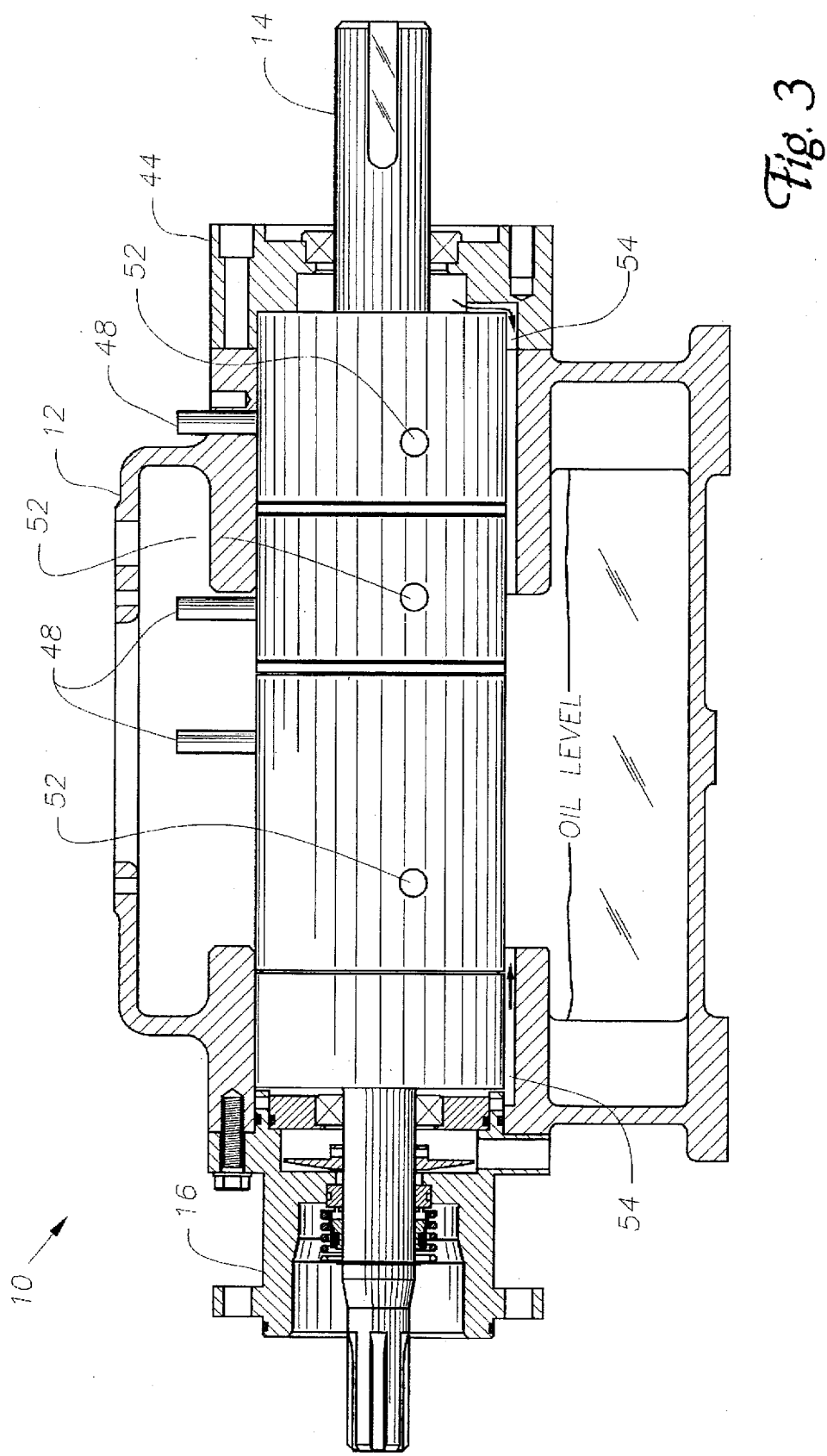
FIG. 3 depicts a cutaway side view of the thrust chamber showing the housing tubes.

FIG. 3 depicts a cutaway side view of thrust chamber 10 showing the housing tubes 20, 22, 24. Apertures 52 allow for excess oil to return to oil chamber 50 along with the outside return channels 54.

While the invention has been shown in only one of its forms, it should be apparent to those skilled in the art that it is not so limited, but is susceptible to various changes without departing from the scope of the invention.

We claim:

1. A thrust chamber comprising:
    a housing;
    a rotatable shaft mounted within the housing;
    a first downthrust bearing section connected to said shaft and to said housing;
    a second downthrust bearing section, connected to said shaft and to said housing, wherein as a downthrust load is placed on said shaft, the first downthrust bearing section receives the load and engages the second downthrust bearing section so as to share the load substantially equally between the first downthrust bearing section and the second downthrust bearing section; wherein each of the downthrust bearing sections comprises:
    a washer retainer connected to the shaft and rotatable therewith;
    a shaft bearing having a rotatable first face and a stationary second face with the rotatable first face connected to the washer retainer;
    a downthrust bearing washer retainer connected to the second face of the shaft bearing in a stationary position; and
    a downthrust bearing spring having one point connected to the downthrust bearing washer retainer and a second point coupled to the housing for transferring the downthrust load from the shaft to the housing.

2. The thrust chamber according to claim 1 further comprising:
    a third downthrust section, connected to the shaft and to the housing, wherein as the load is applied to both the first and second downthrust sections, the load is shared with the third downthrust bearing section so as to apply a substantial equal load to each of the downthrust bearing sections.

3. The thrust chamber of claim 1 wherein said housing further comprises:
    a first housing tube for containing the first downthrust section; and
    a second housing tube for containing the second downthrust section, wherein the first housing tube is coupled to the second housing tube.

4. The thrust chamber of claim 3 further comprising a tube connection ring connecting the first housing tube to the second housing tube and being adjustable so as to apply a preload to the first thrust bearing section and the second thrust bearing section.

5. The thrust chamber of claim 1 wherein the downthrust bearing spring comprises an annular metal disc having a first radius and a second radius where the downthrust bearing washer retainer engages the downthrust bearing spring substantially along the annular peripheral of the first radius while the housing engages the downthrust bearing spring substantially along the annular peripheral of the second radius but on a side opposite the downthrust bearing washer retainer.

6. The thrust chamber of claim 1 wherein each downthrust bearing spring has a spring constant ranging from 300–450 lbs/mil.

7. The thrust chamber of claim 1 wherein each downthrust bearing spring has a spring constant of about 400 lbs/mil.

8. The thrust chamber of claim 1 wherein each downthrust bearing spring has an overload capacity of about 6000 lbs.

9. A thrust chamber comprising:
    a housing;
    a rotatable shaft mounted within the housing;
    a first downthrust bearing section connected to said shaft and to said housing;
    a second downthrust bearing section, connected to said shaft and to said housing, wherein as a downthrust load is placed on said shaft, the first downthrust bearing section receives the load and engages the second downthrust bearing section so as to share the load substantially equally between the first downthrust bearing section and the second downthrust bearing section;
    a lubrication unit, coupled to and integrated with the housing; wherein each of the downthrust bearing sections comprises:
    a washer retainer connected to the shaft and rotatable therewith;
    a shaft washer having a rotatable first face and a stationary second face with the rotatable first face connected to the washer retainer;
    a downthrust bearing washer retainer connected to the second face of the shaft washer in a stationery position; and
    a downthrust bearing spring having one point connected to the downthrust bearing washer retainer and a second point coupled to the housing for transferring the downthrust load from the shaft to the housing.

10. The thrust chamber according to claim 9 further comprising:
    an upthrust bearing section, connected to the shaft and to the housing, for preloading the shaft so as to apply a load to the first downthrust bearing section and the second downthrust bearing section.

11. The thrust chamber according to claim 9 further comprising:
    a third downthrust section, connected to the shaft and to the housing, wherein as the load is applied to both the first and second downthrust sections, the load is shared with the third downthrust bearing section so as to apply a substantial equal load to each of the downthrust bearing sections.

12. The thrust chamber of claim 9 wherein said housing further comprises:
   a first housing tube for containing the first downthrust section; and
   a second housing tube for containing the second downthrust section, wherein the first housing tube is coupled to the second housing tube.

13. The thrust chamber of claim 12 further comprising a tube connection ring connecting the first housing tube to the second housing tube and being adjustable so as to apply a preload to the first thrust bearing section and the second thrust bearing section.

14. The thrust chamber of claim 9 wherein the downthrust bearing spring comprises an annular metal disc having a first radius and a second radius where the downthrust bearing washer retainer engages the downthrust bearing spring substantially along the annular peripheral of the first radius while the housing engages the downthrust bearing spring substantially along the annual peripheral of the second radius but on a site opposite the downthrust bearing washer retainer.

15. The thrust chamber of claim 9 wherein each downthrust bearing spring has a spring constant ranging from 300–450 lbs/mil.

16. The thrust chamber of claim 9 wherein each downthrust bearing spring has a spring constant of about 400 lbs/mil.

17. The thrust chamber of claim 9 wherein each downthrust bearing spring has an overload capacity of about 6000 lbs.

18. The thrust chamber of claim 9 wherein the lubrication unit comprises:
   a lubricant pump;
   an heat exchanger, coupled to the lubricant pump;
   a lubricant collection pan, coupled to the heat exchanger.

19. A thrust chamber comprising:
   a housing;
   a rotatable shaft mounted within the housing;
   a plurality of downthrust bearing sections connected to said shaft and to said housing, each downthrust bearing section being connected to said shaft and to said housing, wherein as a downthrust load is placed on said shaft, one of said plurality of downthrust bearing sections receives the load and engages another downthrust bearing section so as to share the load substantially equally between the plurality of downthrust bearing sections; and
   an upthrust bearing section, connected to the shaft and to the housing, for preloading the shaft so as to apply a load to at least one of the plurality of downthrust bearing sections; wherein each of the downthrust bearing sections comprises:
      a washer retainer connected to the shaft and rotatable therewith;
      a shaft bearing having a rotatable first face and a stationary second face with the rotatable first face connected the washer retainer;
      a downthrust bearing washer retainer connected to the second face of the shaft bearing in a stationary position; and
      a downthrust bearing spring having one point connected to the downthrust bearing washer retainer and a second point coupled to the housing for transferring the downthrust load from the shaft to the housing.

20. The thrust chamber of claim 19 wherein said housing further comprises:
   a first housing tube for containing one of the plurality of downthrust section and the upthrust section; and
   a plurality of second housing tubes each for containing one of the remaining plurality of downthrust sections, wherein the first housing tube is coupled to one of the second housing tubes.

21. The thrust chamber of claim 20 further comprising a tube connection ring connecting the first housing tube to the one second housing tube and being adjustable so as to apply a preload to the one thrust bearing section and the one second thrust bearing section.

22. The thrust chamber of claim 19 wherein the downthrust bearing spring comprises an annular metal disc having a first radius and a second radius where the downthrust bearing washer retainer engages the downthrust bearing spring substantially along the annular peripheral of the first radius while the housing engages the downthrust bearing spring substantially along the annular peripheral of the second radius but on a side opposite the downthrust bearing washer retainer.

23. The thrust chamber of claim 19 wherein each downthrust bearing spring has a spring constant ranging from 300–450 lbs/mil.

24. The thrust chamber of claim 19 wherein each downthrust bearing spring has a spring constant of about 400 lbs/mil.

25. The thrust chamber of claim 19 wherein each downthrust bearing spring has an overload capacity of about 6000 lbs.

26. A thrust chamber comprising:
   a housing;
   a rotatable shaft mounted within the housing for rotation about a shaft axis;
   a first thrust bearing having a rotatable portion mounted to the shaft for rotation therewith and a stationary portion;
   an annular metal first spring having a central hole which receives the shaft, the first spring having an inner edge portion which is engaged by the stationary portion of the first thrust bearing to receive downthrust from the stationary portion of the first thrust bearing, the first spring having an outer edge portion which engages the housing to transmit downthrust imposed on the inner edge portion to the housing;
   a second thrust bearing having a rotatable portion mounted to the shaft for rotation therewith and a stationary portion;
   an annular metal second spring having a central hole which receives the shaft, the second spring having an inner edge portion which is engaged by the stationary portion of the second thrust bearing to receive downthrust from the stationary portion of the second thrust bearing, the second spring having an outer edge portion which engages the housing to transmit downthrust imposed on the inner edge portion to the housing; and
   the first and second springs being axially deflectable between the inner and outer edge portions under downthrust so as to share the lead imposed by the downthrust.

27. The thrust chamber according to claim 26 wherein the first and second springs are flat discs which are in planes perpendicular to the axis when not receiving downthrust.

28. The thrust chamber according to claim 26 wherein:
   the stationary portions of the first and second thrust bearings have shoulders which engage the inner edge portions of the first and second springs, respectively; and the housing has first and second shoulders which engage the outer edge portions of the first and second springs, respectively.

29. The thrust chamber according to claim 26 wherein the first and second shoulders of the housing are axially adjustable relative to each other.

30. The thrust chamber according to claim 26 further comprising:

an upthrust bearing having a rotatable portion mounted to the shaft for rotation therewith and a stationary portion positioned on a side of the rotatable portion that is opposite from the first and second thrust bearings;

an annular metal upthrust spring having a central hole which receives the shaft, the upthrust spring having an inner edge portion which is engaged by the stationary portion of the upthrust bearing, the upthrust spring having an outer edge portion which engages the housing; and wherein the first and second thrust bearings are positioned relative to the upthrust spring so that when not under downthrust, the upthrust spring will exert a preload force on the shaft which is received by the first and second springs and transferred to the housing.

31. The thrust chamber according to claim 26 further comprising:

an upthrust bearing having a rotatable portion mounted to the shaft for rotation therewith and a stationary portion positioned on a side of the rotatable portion that is opposite from the first and second thrust bearings, the stationary portion having an upthrust shoulder;

an annular metal upthrust spring having a central hole which receives the shaft, the upthrust spring having an inner edge portion which is engaged by the upthrust shoulder, the upthrust spring having an outer edge portion which engages an upthrust shoulder formed in the housing; and wherein the stationary portions of the first and second thrust bearings have shoulders which are perpendicular to the axis, the shoulders engaging the inner edge portions of the first and second springs, respectively;

the housing has first and second shoulders which are perpendicular to the axis and which engage the outer edge portions of the first and second springs, respectively; and the first and second shoulders are axially adjustable relative to each other and to the upthrust spring so that when not under downthrust, the upthrust spring will exert a preload force on the shaft which is received by the first and second springs and transferred to the housing.

32. The thrust chamber according to claim 26 wherein:

the housing comprises first and second tubes having first and second shoulders, respectively, which are perpendicular to the axis and which engage the outer edge portions of the first and second springs, respectively; and the first and second tubes are connected together by a threaded connection ring which is rotatable for adjusting the axial spacing between the first and second shoulders, to apply a preload force to the first and second springs.

* * * * *